United States Patent
Pape

(10) Patent No.: US 8,949,545 B2
(45) Date of Patent: Feb. 3, 2015

(54) MEMORY INTERFACE DEVICE AND METHODS THEREOF

(75) Inventor: John D. Pape, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 495 days.

(21) Appl. No.: 12/328,135

(22) Filed: Dec. 4, 2008

(65) Prior Publication Data

US 2010/0146217 A1   Jun. 10, 2010

(51) Int. Cl.
  *G06F 12/02*   (2006.01)
  *G06F 12/08*   (2006.01)

(52) U.S. Cl.
  CPC ........ *G06F 12/0831* (2013.01); *G06F 12/0815* (2013.01); *G06F 2212/1016* (2013.01); *G06F 2212/507* (2013.01)
  USPC ................... 711/141; 711/146; 711/E12.026; 711/E12.033

(58) Field of Classification Search
  USPC .................. 711/141, 146, E12.026, E12.033
  See application file for complete search history.

(56) References Cited

U.S. PATENT DOCUMENTS

| | | | | |
|---|---|---|---|---|
| 5,355,467 A | * | 10/1994 | MacWilliams et al. | 711/146 |
| 5,682,516 A | * | 10/1997 | Sarangdhar et al. | 711/146 |
| 6,351,791 B1 | * | 2/2002 | Freerksen et al. | 711/146 |
| 6,463,554 B1 | | 10/2002 | Budelman et al. | |
| 6,904,480 B1 | | 6/2005 | Hobbs et al. | |
| 7,444,494 B2 | * | 10/2008 | Goodman et al. | 711/213 |
| 7,865,345 B2 | * | 1/2011 | Odagawa et al. | 703/13 |
| 2003/0046356 A1 | | 3/2003 | Alvarez, II et al. | |
| 2003/0154351 A1 | * | 8/2003 | Nilsson et al. | 711/141 |
| 2006/0052995 A1 | * | 3/2006 | Odagawa et al. | 703/14 |
| 2007/0038846 A1 | * | 2/2007 | Kadambi et al. | 712/225 |
| 2007/0113022 A1 | * | 5/2007 | Abraham et al. | 711/144 |
| 2007/0168639 A1 | * | 7/2007 | McCalpin et al. | 711/206 |
| 2007/0255908 A1 | * | 11/2007 | Zeffer et al. | 711/141 |

* cited by examiner

*Primary Examiner* — Arpan P. Savla

(57) ABSTRACT

A data processing device includes a load/store module to provide an interface between a processor device and a bus. In response to receiving a load or store instruction from the processor device, the load/store module determines a predicted coherency state of a cache line associated with the load or store instruction. Based on the predicted coherency state, the load/store module selects a bus transaction and communicates it to the bus. By selecting the bus transaction based on the predicted cache state, the load/store module does not have to wait for all pending bus transactions to be serviced, providing for greater predictability as to when bus transactions will be communicated to the bus, and allowing the bus behavior to be more easily simulated.

20 Claims, 5 Drawing Sheets

| EVENT 302 | PENDING TRANSACTION QUEUE 304 | CACHE UPDATE QUEUE 306 | CURRENT CACHE COHERENCY STATE 308 | PREDICTED CACHE COHERENCY STATE 310 | BUS TRANSACTION 312 |
|---|---|---|---|---|---|
| INITIALIZE | NONE | NONE | I | - | - |
| RECEIVE LOAD1 | NONE | NONE | I | I | READ |
| PLACE LOAD1 IN PENDING QUEUE | LOAD1 | NONE | I | - | - |
| RECEIVE STORE1 | LOAD1 | NONE | I | S | READ-MODIFY |
| PLACE STORE1 IN PENDING QUEUE | LOAD1 STORE1 | NONE | I | - | - |
| SERVICE LOAD1 | STORE1 | LOAD1 | S | - | - |
| RECEIVE LOAD2 | STORE1 | LOAD1 | S | M | NONE |
| PLACE LOAD2 IN PENDING QUEUE | LOAD2 STORE1 | LOAD1 | S | - | - |
| SERVICE STORE1 | NONE | LOAD1 LOAD2 STORE1 | M | - | - |

TIME →

MEMORY INTERFACE DEVICE AND METHODS THEREOF

FIELD OF THE DISCLOSURE

The present disclosure relates to data processing devices and more particularly relates to bus interface devices.

BACKGROUND

Data processing devices typically employ a load/store module to transfer data between a processor, a local cache, and a common device memory. The load/store module generally interfaces with a bus in order to read or write data to the common memory. In addition, the load/store module typically maintains coherency information for the local cache. In particular, for load or store instructions received from the processor, the load/store module selects from a range of possible bus transactions according to whether data is to be read or written, and based on the intended impact of the transaction on memory coherency. Multi-processor systems typically employ a different load/store module for each processor, with the bus transactions from each load/store module impacting the coherency of each local cache. Further, in multi-processor systems the time at which each bus transaction is serviced can be subject to a large degree of uncertainty, so that simulation of bus behavior is difficult.

BRIEF DESCRIPTION OF THE DRAWINGS

FIG. 3 is a diagram illustrating an example operation of the load/store module of FIG. 1.

The use of the same reference symbols in different drawings indicates similar or identical items.

DETAILED DESCRIPTION

A data processing device includes a load/store module to provide an interface between a processor device and a bus. In response to receiving a load or store instruction from the processor device, the load/store module determines a predicted coherency state of a cache line associated with the load or store instruction. Based on the predicted coherency state, the load/store module selects a bus transaction and communicates it to the bus. By selecting the bus transaction based on the predicted cache state, the load/store module does not have to wait for all pending bus transactions to be serviced, providing for greater predictability as to when bus transactions will be communicated to the bus, and allowing the bus behavior to be more easily simulated.

Figure 1:
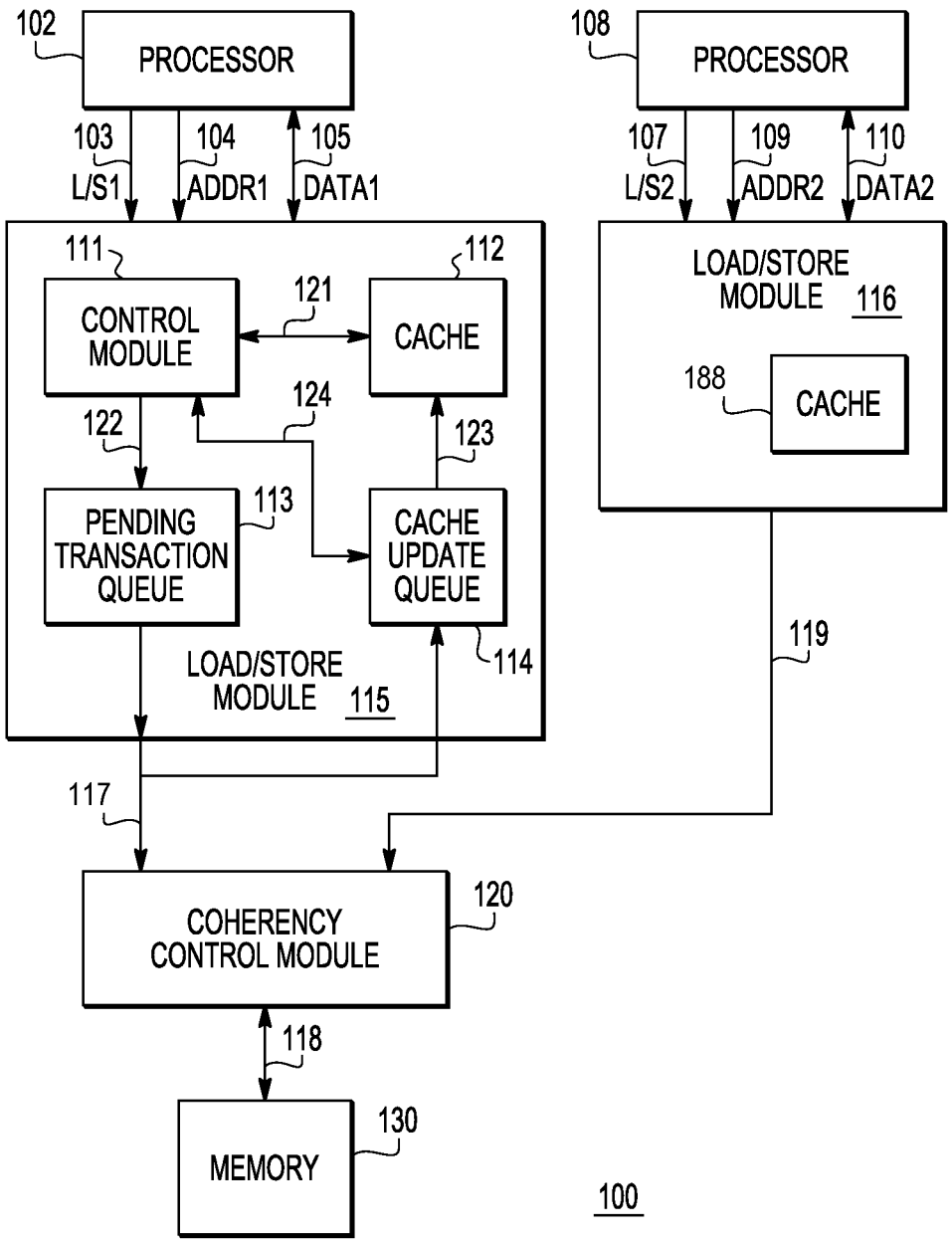
FIG. 1 is a block diagram of a data processing device in accordance with one embodiment of the present disclosure.

FIG. 1 illustrates a particular embodiment of a data processing device 100 that includes multiple processors sharing a common memory. Each processor of the device can maintain local copies of data from the common memory in a cache. A coherency control module maintains coherency between local copies of data and data stored in the common memory. For example, the coherency control module can monitor bus transactions (e.g. read and write transactions) targeted to the memory and snoop the local caches the memory to determine changes (or predicted changes) in locally stored copies of data, and enforce a coherency protocol to ensure that multiple processors do not modify their locally stored copy.

The data processing device 100 maintains an addressable memory space having a plurality of memory space locations, with each memory space location associated with a designated memory address. Each memory space location can be associated with more than one physical memory location at the common memory and the processors' local caches. Thus, a memory space location can simultaneously be associated with a physical location of the common memory and a local processor cache. Each physical location can maintain a separate copy of the data. The coherency control module enforces a coherency protocol so that copies of data at different local caches are not simultaneously modified by the associated processors. The enforcement of the coherency protocol for a memory space location is referred to herein as maintaining the coherency of the memory space location.

As illustrated in FIG. 1, the data processing device 100 includes processors 102 and 108, load/store modules 115 and 116, a coherency control module 120 and a memory 130. The processor 102 includes an output connected to a bus 103 to provide a signal labeled "L/S1", an output connected to a bus 104 to provide a signal labeled "ADDR1", and an input/output port connected to a bus 105 to receive and provide a signal labeled DATA1. The load/store module 116 includes a cache 117. The load/store module 115 includes an input connected to the bus 103, an input connected to the bus 104, an input/output port connected to the bus 105, and an input/output port connected to a bus 117.

The processor 108 includes an output connected to a bus 107 to provide a signal labeled "L/S2", an output connected to a bus 109 to provide a signal labeled "ADDR2", and an input/output port connected to a bus 110 to receive and provide a signal labeled "DAT1." The load/store module 116 includes an input connected to the bus 107, an input connected to the bus 109, an input/output port connected to the bus 110, and an input/output port connected to a bus 119. The coherency control module 120 includes an input/output port connected to the bus 117, an input/output port connected to the bus 119, and an input/output port connected to a bus 118. The memory 130 includes an input/output port connected to the bus 118. Other memories and peripherals (not shown) can be connected to bus 118.

The processor 102 is a data processing device configured to execute instructions in order to perform designated tasks. Accordingly, the processor 102 can be a general-purpose processor, an application specific integrated circuit, and the like. The instructions executed by the processor 102 can include load instructions, whereby the processor 102 retrieves data stored external to the processor (e.g. in memory or in a cache). To execute a load instruction, the processor 102 provides an address associated on the bus 104 and provides information on the bus 103 to indicate the address is associated with a load instruction. The processor 102 subsequently receives the data associated with the address via the bus 105.

In addition, the processor 102 is configured to execute store instructions, whereby data is provided by the processor 102 for storage external to the processor. To execute a store instruction, the processor 102 provides the data to be stored on the bus 105 and provides an address associated with the memory space location where the data is to be stored on the bus 104. In addition, the processor 102 provides information via the bus 103 to indicate the provided address and data are associated with a store operation.

The processor 108 is a data processing device configured to execute instructions, similar to the processor 102. In the illustrated embodiment, the processor 108 executes instructions independently and in parallel to the processor 108, thereby enhancing the efficiency of the data processing device 100. The processor 108 is configured to execute load/store instructions using the busses 107, 109 and 110 in similar fashion to that described above with respect to the processor 102.

The coherency control module 120 is configured to receive bus transactions via the busses 117 and 119. A bus transaction can be a read transaction, requesting data be retrieved, or a write transaction, requesting data to be written. Each bus transaction includes a bus transaction type, indicating whether the transaction is associated with a read or write operation, as well as the memory address associated with the transaction and, in the case of a write transaction, the data to be written. The bus transaction type can also indicate coherency information associated with the data. For example, one type of read bus transaction (referred to herein as a "Read-Modify" transaction) can indicate that the data being read will be modified by the device that provided the bus transaction.

In response to a bus transaction, the coherency control module 120 determines the coherency state of the memory space location associated with the transaction, and communicates coherency information to the modules of the data processing device 100 to ensure the coherency of the memory location is maintained. In addition, the coherency control module 120 can enforce coherency protocols for the data processing system 100, requiring local copies of data to be invalidated, written to common memory, and the like, in order to maintain coherency of each memory space location.

The coherency control module 120 is further configured to provide the bus transactions to the bus 118. In an embodiment, the coherency control module 120 can reorder received bus transactions prior to providing the transactions to the bus 118 in order to maintain coherency of the memory space locations associated with each bus transaction. In addition, the coherency control module can receive data resulting from a read bus transaction on the bus 118, and provide the received data to the bus 117 or 119 that provided the bus transaction.

The memory 130 is a volatile memory, such as random access memory (RAM), or non-volatile memory configured to write and retrieve data based on received bus transactions. Retrieved data is provided via the bus 118.

The load/store module 115 is configured to execute load and store commands based on information received via the busses 103, 104, and 105. In particular, the load/store module 115 receives information via the bus 103 indicating whether a load or store operation is requested. In the event of a load command, the load/store module 115 also receives an address associated with the memory space location of the load operation via the bus 104. The load/store module 115 retrieves the data associated with the memory space location and provides it via the bus 105. In the event of a store command, the load/store module 115 receives data via the bus 105 and an address via the bus 104 indicating the memory space location where the data should be stored. The load/store module 115 stores the received data at the indicated memory space location.

In particular, the load/store module 115 includes a control module 111, a cache 112, a pending transaction queue 113, and a cache update queue 114. The control module 111 includes an input/output port connected to a bus 121, an input output port connected to a bus 124, and an input/output port connected to a bus 122. The pending transaction queue includes an input/output port connected to the bus 122 and an output connected to the bus 117. The cache update queue 114 includes an input/output port connected to the bus 124, an input connected to the bus 117 and an output connected to a bus 123. The cache 112 includes an input/output port connected to the bus 121 and an input connected to the bus 123.

The cache 112 is a memory configured to store information in a plurality of memory locations, referred to herein as a cache line. Each cache line is associated with an address. In response to receiving address information via the bus 121, the cache 112 is configured to determine if there is a cache line associated with the received address. If so, the cache 112 indicates a cache hit via the bus 121, and provides the data stored at the associated cache line on the bus 121. If the cache 112 does not have a cache line associated with the received address, the cache 112 indicates a cache miss via the bus 121. The cache 112 also stores coherency information for data stored at each cache line. In an embodiment, the coherency information complies with a "MESI" protocol, whereby the coherency information indicates if the data in a cache line is in a modified, exclusive, shared, or invalid state. In addition, the cache 112 is configured to receive data via the bus 123, as well as a memory address associated with the received data. The cache 112 stores the received data at a cache line, and associates the cache line with the memory address. In other embodiments, cache 112 can be configured or operate in another manner.

The cache update queue 114 is configured to receive and store data and associated address information provided via the bus 117. The cache update queue 114 is further configured to provide the stored data and address information to the cache 112. The pending transaction queue 113 is configured to receive bus transactions from the control module 111 and provide the bus transactions to the bus 117. In an embodiment, the pending transaction queue stores each bus transaction in a bus transaction record. This can be better understood with reference to FIG. 2.

Figure 2:
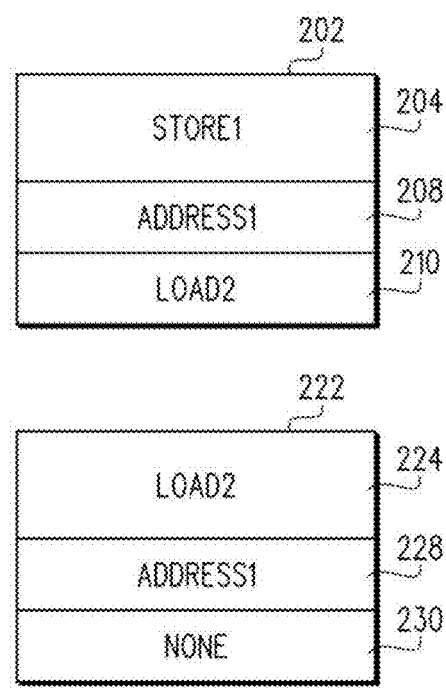
FIG. 2 is a diagram illustrating a particular embodiment of pending bus transaction records of the data processing device of FIG. 1.

FIG. 2 illustrates a particular embodiment of bus transaction records 202 and 222 stored at the pending transaction queue 113. Each of the bus transaction records 202 and 222 includes a number of fields, including a command type field (fields 204 and 224, respectively), an address field (fields 208 and 228, respectively), and a dependency field (fields 210 and 230, respectively). The command type field indicates whether the bus transaction record is associated with a load command, a store command, or other type of command. The address field indicates the address associated with the bus transaction. The dependency field stores information indicating whether the pending transaction is dependent on servicing of another pending transaction in the pending transaction queue 113. Thus, in the illustrated example of FIG. 2, field 210 of bus transaction record 202 indicates that the pending transaction designated "STORE1" is dependent on the pending transaction "LOAD2." As described further herein, when a pending transaction is serviced, all pending transactions dependent on the serviced transaction are also serviced.

Referring again to FIG. 1, the control module 111 is configured to determine if a load or store command is indicated via the bus 103 indicating a load or store operation. In response to determining a load command is indicated, the control module 111 provides address information received via the bus 104 to the bus 121 and determines whether a cache hit is indicated in response. If a cache hit is indicated, the control module 111 receives data associated with the address via the bus 121 and provides the data via the bus 105. If a cache miss is indicated by the bus 121, the control module 111 searches the pending queue 113 to determine if there are any pending bus transactions associated with the memory space address of the read transaction. In the event there are no pending transactions associated with the memory space address, the control module 111 provides a read bus transaction type via the bus 122, together with the memory space address. If there are pending transactions associated with the memory space address, the control module 111 determines a predicted state of a cache line associated with the memory space address, and determines a bus transaction type based on the predicted cache line.

In the event a store command is indicated via the bus 103, the control module 111 determines a predicted coherency state of a cache line associated with the store operation. Based on the predicted coherency state, the control module 111 determines a bus transaction for the store operation and provides the determined bus transaction to the bus 122.

To illustrate, during operation the processor 102 determines to store data at a memory space location. Accordingly, the processor 102 provides the address of the memory space location via the bus 104 and the data to be stored via the bus 105. In addition, the processor 102 provides an indication via the bus 103 that a store operation is requested. In response, the control module 111 provides the memory space address to the cache 112, which indicates whether there is a cache hit (i.e. whether a cache line is currently associated with the memory space address) or a cache miss via the bus 121.

In response to a cache miss and a determination that there are no dependent transactions in the pending transaction queue associated with the memory space address, the control module 111 provides a read bus transaction to the pending transaction queue 113, which provides the transaction to the bus 117. The coherency control module 120 receives the read bus transaction, and determines the location where the most up-to-date copy of data associated with the memory space address is stored. The coherency control module 120 retrieves the data from the determined location and provides it to the bus 117. In response, the retrieved data is provides to the cache update queue 114, which in turn provides the data to the cache 112 for storage. In addition, in response to the data being received at the cache update queue 114, the bus transaction is removed from the pending transaction queue 113. Thus, the pending transaction queue 113 stores pending bus transactions until those transactions have been ordered by the cache control module 120.

In response to a cache hit resulting from the store operation, the control module 111 determines a bus transaction based on a predicted coherency state for the cache line associated with the received memory space address. In particular, the control module 111 retrieves the current coherency state for the cache line associated with the memory space address from the cache 112. Further, the control module 111 determines the pending bus transactions for the memory space address that are stored at the pending transaction queue 113 and, based on those transactions and the current coherency state of the cache line, determines a predicted coherency state of the cache line.

In an embodiment, the control module 111 determines the pending bus transaction by searching the address fields of the bus transaction records in sequential fashion, until an address matching the memory space address is located. This is referred to herein as an "address collision." In response to an address collision, the control module 111 traverses the pending transaction queue 113 to determine if there are any pending transactions dependent on the bus transaction that resulted in the collision. In particular, the dependent pending transactions are arranged as a chain or linked list of information. The control module 111 traverses the linked list to determine the highest guaranteed cache state after each transaction in the list is serviced, where a modified state is higher than an exclusive state, an exclusive state is higher than a shared-last state, a shared-last state is higher than a shared state, and a shared state is higher than an invalid state.

Based on the pending bus transactions, and the current coherency state of the cache line associated with the memory space address, the control module 111 determines a predicted coherency state for the cache line. The control module 111 then determines a bus transaction based on the predicted coherency state and stores the bus transaction at the pending transaction queue 113. The pending transaction queue 113 provides the bus transaction to the coherency control module 120 for processing.

In an embodiment, the control module 111 selects the bus transaction according to the following table:

| Command | WI | Predicted Cache State | Transaction Size | Possible Bus Transactions |
| --- | --- | --- | --- | --- |
| Store | 00 | M, E | x | None |
|  |  | S, SL | 64 Bytes | Modify-Claim, Read-Claim, Read-Modify |
|  |  |  | >0 Bytes <64 Bytes | Replace-Claim, Read-Modify |
|  |  |  | 0 Bytes | Modify Claim, Read-Modify, Touch-Claim |
|  |  | I | 64 Bytes | Replace-Claim, Read-Modify |
|  |  |  | >0 Bytes <64 Bytes | Read-Modify |
|  |  |  | 0 Bytes | Read-Modify, Touch-Claim |
|  | 10 | M, E, S, SL, I | x | Write-through, Non-contiguous write |
|  | x1 | M, E, S, SL, I | 64 Bytes | Non-contiguous write, Cache-inhibited write |
|  |  |  | <64 Bytes | Cache-inhibited write |
| Load | x0 | M, E, S, SL | x | None |
|  | x1 | M, E, S, SL | x | Error |
|  | xx | I | x | Read |

The Command column indicates whether the received command is a load or store command. The WI column indicates characteristics of the received command as reflected in a pair of bits, referred to herein as WI bits. In particular, if the W bit is set, the command is a write-through command, indicating that any information stored to the cache 112 should be also be written to the memory 130. The I bit indicates whether the operation is a cache-inhibited operation.

The Predicted Cache State column indicates the predicted state of the cache line associated with the received memory space address. The control module 111 determines the predicted cache state based on the current state of the cache line and based on any bus transactions associated with the cache line that are pending at the pending transaction queue. In the table, "M" refers to a modified state, "E" refers to an exclusive state, "S" refers to a shared state, "SL" refers to a "shared-last" state, indicating that cache was the last reader of the cache line, and "I" refers to an invalid state. In the illustrated embodiment of FIG. 1, it is assumed that the cache 112 will indicate an invalid state when a cache line has not been assigned to a received memory address or that a cache line assigned to a received memory address does not store valid data.

The transaction size column indicates a size associated with the received command as indicated by information received via the bus 103. The size indicates the amount of data to be loaded or stored. The possible bus transactions indicates the bus transactions available to be selected by the control module 111 based on the command received, the state of the WI bits, the predicted cache state of a cache line associated with the memory address, and the transaction size associated with the received command. A Modify-Claim transaction indicates that the processor 102 is updating the state of the cache line from a shared state to a modify state, and only needs data returned from the memory 130 if the cache line has been invalidated by another processor. The Replace-Claim transaction indicates that the processor 102 is placing the cache line in a modified state, but does not need data to be returned from the memory 130 as the processor 102 intends to replace the entire cache line. The Touch-Claim transaction indicates that the processor 102 is placing the cache line in a modified state, but is not going to actually change any data in the cache line.

Thus, for example, the table indicates that if a store command is received with both the WI bits cleared, and if the predicted state of the cache line associated with the received memory space address is a shared state, and the size associated with the command is 64 bytes, then the control module can select from the Modify-Claim, Replace-Claim, and Read-Modify transactions. In an embodiment, the bus transaction is selected from the set of possible transactions in a random or pseudo-random fashion.

Operation of the load/store module 115 can be better understood with reference to FIG. 3, which illustrates a table 300 depicting an example operation of the module. The table 300 includes an event column 302, a pending transaction queue column 304, a cache update queue 306, a cache coherency state column 308, a predicted cache coherency state column 310, and a bus transaction column 312. The event column 302 designates an event occurring at the load/store module 115. For purposes of discussion, it is assumed that the events illustrated at column 302 are each related to the same memory address, referred to as ADDRESS1.

The pending transaction queue column 304 indicates the load and store commands stored at the pending transaction queue 113 for ADDRESS1. The cache update queue 306 indicates the load and store commands stored at the cache update queue 114 for ADDRESS1. The cache coherency state column 308 indicates the actual coherency state of a cache line associated with ADDRESS1 at the cache 312. The predicted cache coherency state column 310 indicates the predicted coherency state of the cache line in response to the associated event. The bus transaction column 312 indicates the bus transaction selected by the control module 111 in response to the event.

In the illustrated example of FIG. 3, event 320 causes a system initialization for the load/store module 115. In response, the pending transaction queue 113, cache update queue 114, and cache 112 are cleared. Thus, as illustrated in columns 304 and 306, the pending transaction queue 313 and cache update queue 114 do not store any bus transactions for ADDRESS1, and, as indicated by column 308, the cache coherency state is set to invalid ("I") (indicating a cache line has not been assigned to ADDRESS1).

Subsequent to the system initialization, at event 322, a first load command (labeled "LOAD1") is received at the control module 111. In response, the control module 111 determines that the current cache coherency state is invalid and, because there are no pending transactions associated with ADDRESS1, the predicted cache coherency state is also invalid. Accordingly, as illustrated at column 312, the control module 111 selects a READ bus transaction in response to the LOAD1 instruction, and provides the READ bus transaction to the pending transaction queue 113 and to the bus 117. At event 324, a bus transaction record associated with the LOAD1 command is stored at the pending transaction queue 113.

At event 326, a store command (labeled "STORE1") is received at the control module 111. In response, the control module 111 determines that the current cache coherency state the cache line associated with ADDRESS1 is invalid. In addition, the control module 111 searches the pending transaction queue 113 and determines an address collision with the LOAD1 command. In response, the control module 111 determines a predicted coherency state of the cache line associated with ADDRESS1. In the illustrated example of FIG. 3, the control module 111 determines, based on the LOAD1 command, that the predicted coherency state of the cache line is a shared (labeled "S") state. That is, although the possible state of the cache line in response to servicing of the LOAD1 command is a shared state or an exclusive state, the highest state that is guaranteed is the shared state. Accordingly, the control module 111 determines that a Read-Modify transaction should be provided to the bus 117.

It will be appreciated that the predicted cache coherency state of the cache line can be selected from one of a number of possible states. In an embodiment, the control module 111 selects the predicted cache coherency state so that the resulting bus transaction will result in coherency being maintained for any of the number of possible states. For example, in the illustrated example of FIG. 3, the actual coherency state that would result from the LOAD1 command could be either a shared state or an exclusive state. If the control module 111 were to select the predicted cache coherency state as the exclusive state, then no bus transaction would be provided to the bus 117, so that the STORE1 command would be satisfied from the cache 111. However, if the actual state that resulted from the LOAD1 command were a shared state, satisfaction of the STORE1 command from the cache 111 could result in a coherency error (e.g. if the cache line were to be invalidated by the coherency control module 120 prior to the STORE1 command being satisfied). In contrast, by selecting the predicted cache coherency state as the shared state, a Read-Modify bus transaction is provided to the bus 117, so that the STORE1 command is satisfied from the memory 130. Accordingly, even if the LOAD1 command were to result in the actual coherency state of the cache line being set to the exclusive state, no coherency error would result.

At event 328, the STORE1 command is stored in the pending transaction queue 304. Because the LOAD1 and STORE1 command each resulted in an independent bus transaction being provided to the bus 117, no dependency is created between the commands.

At event 330, the LOAD1 command is serviced. In particular, an indication is received at the load/store module 115 that the read transaction associated with the LOAD1 command has been ordered at the coherency control module 120. In response to the indication, the LOAD1 command is transferred to the cache update queue 114, as illustrated at column 306. In addition, the cache coherency state for the cache line associated with ADDRESS1 is set to the shared state or the exclusive state, depending on the coherency response from the coherency control module 120. In the illustrated example, it is assumed that the coherency response resulting from the LOAD1 command indicates a shared state, as illustrated at column 308.

At event 332, a second load command (labeled "LOAD2") is received at the control module 111. In response, the control module 111 determines that the current cache coherency state for the cache line associated with ADDRESS1 is the shared state. In addition, the control module 111 searches the pending transaction queue 113 and determines an address collision with the STORE1 command. In response, the control module 111 determines a predicted coherency state of the cache line associated with ADDRESS1. In the illustrated example of FIG. 3, the control module 111 determines, based on the LOAD1 command, that the predicted coherency state of the cache line is a modified (labeled "M") state. Accordingly, the control module 111 determines that no bus transaction should be communicated based on the LOAD1 command.

At event 334, the LOAD2 command is stored in the pending transaction queue 304. Because completion of the LOAD2 command is dependent on completion of the STORE1 command, a dependency is created between the commands, as indicated by arrow 335.

At event 336, the STORE1 command is serviced. In response, the STORE1 command is transferred to the cache update queue 114, as illustrated at column 306. In addition, because the LOAD2 command has a dependency on the STORE1 command, it is also transferred to the cache update queue 114. Further, the cache coherency state for the cache line associated with ADDRESS1 is set to the modified state, as illustrated at column 308. In addition, a dependency is set for the STORE1 command with respect to the LOAD1 command in the cache update queue 114, indicating the LOAD1 command should be satisfied at the cache 112 prior to satisfying the STORE1 command.

Figure 4:
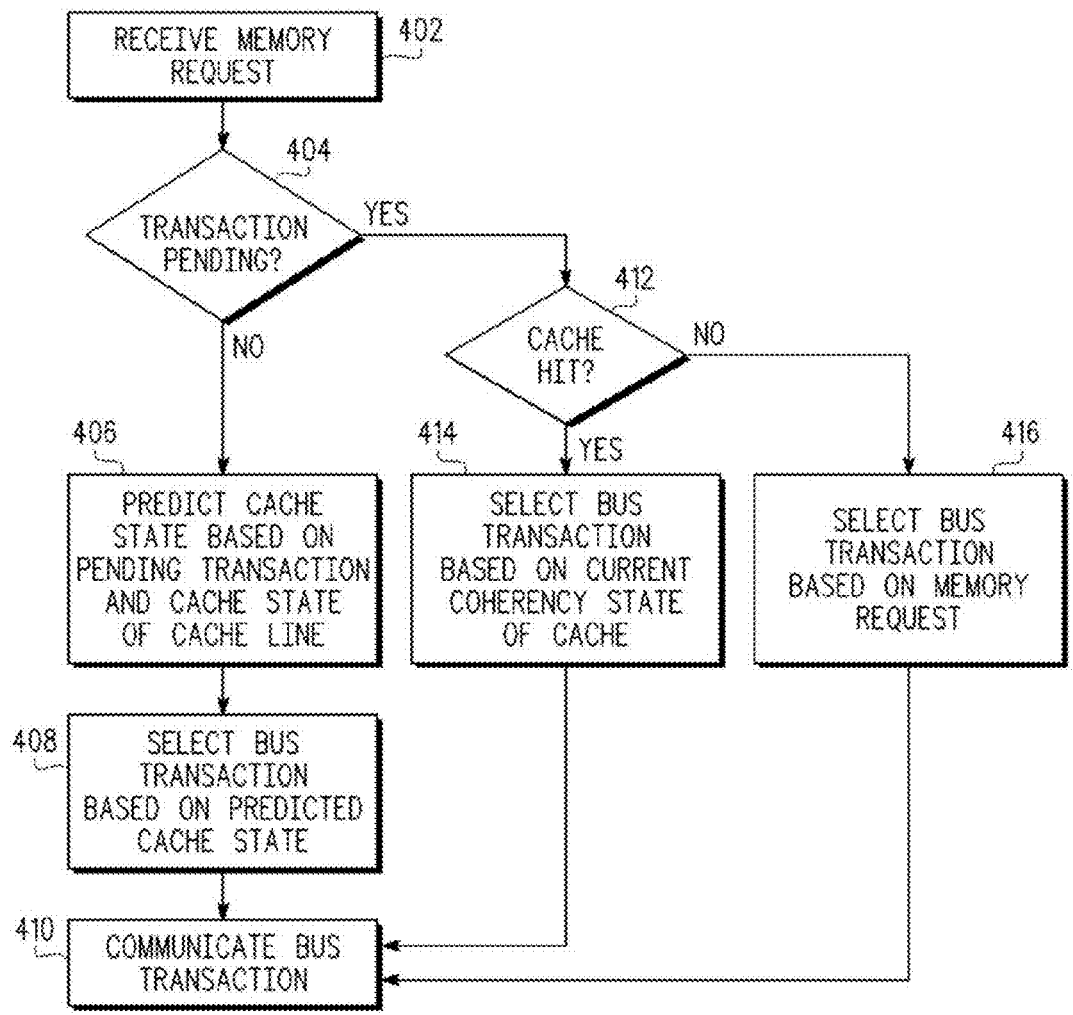
FIG. 4 is a flow diagram of a method of determining a bus transaction according to one embodiment of the present disclosure.

Referring to FIG. 4 a flow diagram of a particular embodiment of a method of determining a bus transaction is illustrated. At block 402, the control module 111 (FIG. 1) receives a memory request indicative of a load or store instruction for a memory space address. At block 404, the control module 111 determines if there is an address collision for the memory space address at the pending transaction queue 113. If so, at block 406 the control module 111 traverses the linked list of pending transactions at the pending transaction queue to determine the set of pending transactions and, based on the pending transactions and the current cache state of the cache line, if any, associated with the memory space address, determines a predicted cache line state. At block 408, the control module 111 determines a set of possible bus transactions based on the predicted cache state, and selects a bus transaction from the set. At block 410, the control module 111 communicates the selected bus transaction to the bus 117.

Returning to block 404, if the control module 111 determines that there is not an address collision at the pending transaction queue 113, the method flow proceeds to block 412 and the control module 111 determines if there is a cache hit at the cache 112 for the memory space address. If so, at block 414 the control module 111 selects a bus transaction based on the current coherency state of the cache line associated with the memory space address. The method flow moves to block 410 and the control module 111 communicates the selected bus transaction to the bus 117.

If, at block 412, the control module 111 determines a cache miss, the method flow moves to block 416 and the control module 111 selects a bus transaction based on the received memory request. The method flow moves to block 410 and the control module 111 communicates the selected bus transaction to the bus 117.

It will be appreciated that although for purposes of discussion the data processing device 100 has been described with respect to the operation of a physical device, in other embodiments the data processing device 100 can represent a simulation of a physical device. Accordingly, each of the illustrated items of the data processing device 100 can represent a behavioral model of an associated design for a physical data processing device. For example, the load/store module 115 can represent a behavioral model of a load/store device that receives stimuli representing simulated load or store commands. This can be better understood with reference to FIG. 5.

Figure 5:
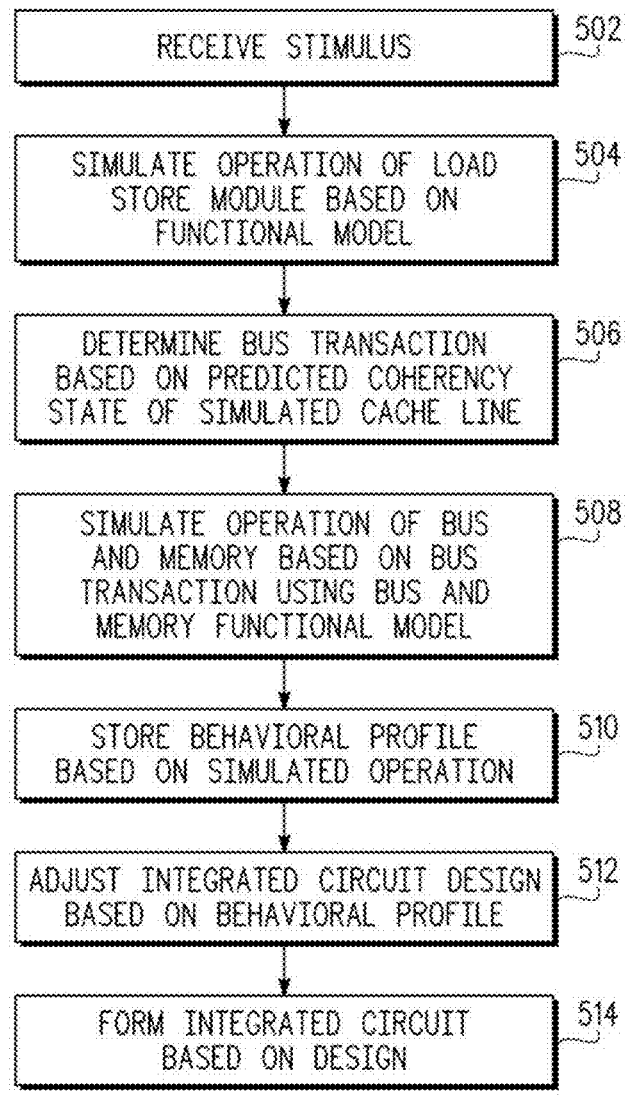
FIG. 5 is a flow diagram of a method of simulating operation of a data processing device according to one embodiment of the present disclosure.

FIG. 5 illustrates a flow diagram of a particular embodiment of a method of simulating operation of a data processing device. At block 502, the behavioral model represented by the load/store module 115 receives a stimulus representing a load or store command. At block 504, based on the stimulus, and using the behavioral model, a simulator simulates behavior of the load/store module 115. At block 506, in the course of simulating the behavior of the load/store module 115, the simulator determines a bus transaction based on a predicted coherency state of a simulated cache line. At block 508, based on the determined bus transaction, and using an associated behavioral model the simulator simulates the behavior of the bus 117 and the memory 130. At block 510, the simulator stores information indicative of the simulated behavior at a behavioral profile. At block 512, the behavioral profile is analyzed and, based on the analysis, a design of the data processing device is adjusted. At block 514, an integrated circuit is formed based on the adjusted design.

The disclosure has been described with reference to specific embodiments. However, it will be appreciated that various modifications and changes can be made without departing from the scope of the present disclosure as set forth in the claims below. For example, it will be appreciated that busses and other connections illustrated as single lines can include multiple lines for communication of information. Further, busses illustrated as bi-directional lines can be bi-directional busses or one or more uni-directional busses. Further, busses illustrated as single bus for discussion purposes can include more than one bus. Thus, the bus 105 of FIG. 1 can include two or more uni-directional busses. In addition, it will be appreciated that for purposes of discussion a bus can be referred to as communicating a signal and that each such signal can include multiple signals for communication of information. Thus, the DAT1 signal of FIG. 1 can include multiple signals to communicate multiple bits of data in parallel fashion. Therefore, many options exist for transferring signals. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure.

What is claimed is:

1. A method comprising:
    receiving a first memory request associated with a first address;

in response to receiving the first memory request, determining, via a control module within a load/store module, a first predicted coherency state of a first cache location associated with the first address by selecting the first predicted coherency state from a plurality of possible states based on a type of a first pending bus transaction associated with the first address, the first pending bus transaction resulting from a second memory request received prior to the first memory request, the type of the first pending bus transaction selected from the group consisting of a load transaction and a store transaction;

determining, via the control module, a first bus transaction based on the first predicted coherency state; and communicating the first bus transaction.

2. The method of claim 1, wherein determining the first predicted coherency state comprises determining the first predicted coherency state based on a corresponding type of each of a plurality of pending bus transactions associated with the first address, the plurality comprising the first pending bus transaction, the type of each of the plurality of pending bus transactions selected from the group consisting of load transactions and store transactions.

3. The method of claim 1, wherein the first predicted coherency state is selected from the group consisting of a shared state, a modified state, an exclusive state, or an invalid state.

4. The method of claim 1, wherein the determining the first predicted coherency state comprises:

determining a link between the first pending bus transaction and a second pending bus transaction in response to determining the first pending bus transaction and the second pending bus transaction are associated with a common cache location; and determining the first predicted coherency state based on the second pending bus transaction in response to determining the link.

5. The method of claim 1, further comprising:

retiring the first pending bus transaction in response to receiving a retirement indication; and transferring the first pending bus transaction from a pending bus transaction queue to a retired instruction queue in response to retiring the first pending bus transaction.

6. The method of claim 1, further comprising:

receiving a third memory request associated with the first address;

determining a second predicted coherency state of the first cache location based on the first pending bus transaction;

determining a second bus transaction based on the second predicted coherency state; and communicating the second bus transaction.

7. The method of claim 1, further comprising:

receiving a second memory request associated with a second address;

determining a second predicted coherency state of a second cache location based on a second pending bus transaction associated with the second address;

determining a second bus transaction based on the second predicted coherency state; and communicating the second bus transaction.

8. The method of claim 1, wherein determining the first bus transaction comprises determining the first bus transaction based on a data size associated with the first memory request.

9. The method of claim 1, wherein determining the first bus transaction comprises:

determining a set of available bus transaction types based on the first predicted coherency state; and selecting the first bus transaction from the set of available bus transaction types.

10. The method of claim 1, wherein the first predicted coherency state is not based on a type of the first memory request.

11. A method, comprising:

receiving a first stimulus indicative of a first simulated memory request associated with a first address;

determining, via a control module within a load/store module, a first predicted coherency state of a first simulated cache location associated with the first address based on a type of a first pending bus transaction associated with the first address, the first pending bus transaction resulting from a second simulated memory request received prior to the first stimulus, the type of the first pending bus transaction selected from the group consisting of a load transaction and a store transaction;

determining, via the control module, a first bus transaction based on the first predicted coherency state; and simulating operation of a bus based on the first bus transaction.

12. The method of claim 11, wherein simulating operation of the bus comprises determining a behavioral profile of a behavioral model based on the first bus transaction.

13. The method of claim 12, further comprising creating an integrated circuit device design based on the behavioral profile.

14. The method of claim 13, further comprising forming an integrated circuit based on the integrated circuit device design.

15. The method of claim 11, wherein determining the first predicted coherency state comprises determining the first predicted coherency state based on a plurality of pending bus transactions associated with the first address, the plurality comprising the first pending bus transaction.

16. A device, comprising:

a cache;

a load/store module further comprising:

a pending bus transaction queue comprising an input configured to receive bus transactions and an output coupled to a bus, the pending bus transaction queue configured to store pending bus transactions associated with the cache; and a control module comprising an input configured to receive a first memory request associated with the cache, an input coupled to the cache and an output coupled to the input of the pending bus transaction queue, the output configured to communicate bus transactions in response to the memory requests, the control module configured to select one or more of the bus transactions based on a predicted coherency state of a cache line of the cache, the predicted coherency state based on types of pending bus transactions stored at the pending bus transaction queue prior to receiving the first memory request, the types of pending bus transactions selected from the group consisting of load transactions and store transactions.

17. The device of claim 16, wherein the control module is configured to determine the predicted coherency state based on the pending bus transactions.

18. The device of claim 16, further comprising:

a bus configured to receive the bus transactions;

a coherency control module coupled to the bus, the coherency control module configured to determine a plurality of coherency messages based on the bus transactions; and a memory coupled to the coherency control module, the memory configured to store or retrieve data in response to one or more of the bus transactions.

19. The device of claim 16, further comprising:
a processor coupled to the input of the control module to provide the memory requests.

20. The device of claim 16, wherein the predicted coherency state is selected from the group consisting of a shared state, a modified state, an exclusive state, or an invalid state.

* * * * *